(12) United States Patent
Namuduri et al.

(10) Patent No.: US 12,391,148 B2
(45) Date of Patent: Aug. 19, 2025

(54) BATTERY HEATING SYSTEM

(71) Applicant: GM GLOBAL TECHNOLOGY OPERATIONS LLC, Detroit, MI (US)

(72) Inventors: Chandra S. Namuduri, Troy, MI (US); Neeraj S. Shidore, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1052 days.

(21) Appl. No.: 17/392,487

(22) Filed: Aug. 3, 2021

(65) Prior Publication Data

US 2023/0043498 A1 Feb. 9, 2023

(51) Int. Cl.
*B60L 58/27* (2019.01)
*H01M 10/0525* (2010.01)
*H01M 10/615* (2014.01)
*H01M 10/625* (2014.01)
*H02M 7/5387* (2007.01)
*H05B 1/02* (2006.01)

(52) U.S. Cl.
CPC ........... *B60L 58/27* (2019.02); *H01M 10/615* (2015.04); *H01M 10/625* (2015.04); *H02M 7/5387* (2013.01); *H05B 1/0236* (2013.01); *B60L 2210/46* (2013.01); *H01M 10/0525* (2013.01)

(58) Field of Classification Search
CPC ................ B60L 58/27; B60L 2210/46; B60L 2240/545; B60L 2240/80; H01M 10/615; H01M 10/625; H01M 10/0525; H01M 10/637; H02M 7/5387; H02M 7/4815; H02M 3/1584; H05B 1/0236; Y02E 60/10; Y02T 10/70
See application file for complete search history.

(56) References Cited

U.S. PATENT DOCUMENTS

| | | | |
|---|---|---|---|
| 10,369,900 B1 * | 8/2019 | Conlon | B60L 53/14 |
| 10,641,740 B2 * | 5/2020 | Barshinger | G01N 29/2437 |
| 2015/0318848 A1 * | 11/2015 | Kandah | H02M 1/08 327/109 |
| 2016/0075241 A1 * | 3/2016 | Hao | B60L 7/18 903/906 |
| 2022/0320876 A1 * | 10/2022 | Gao | H01M 50/251 |

FOREIGN PATENT DOCUMENTS

EP 2853002 B1 * 3/2018 .......... B60L 11/1875

* cited by examiner

*Primary Examiner* — Brian W Jennison
(74) *Attorney, Agent, or Firm* — CANTOR COLBURN LLP

(57) ABSTRACT

AC current heating of a battery is performed using a half-bridge based quasi-resonant circuit.

20 Claims, 3 Drawing Sheets

BATTERY HEATING SYSTEM

INTRODUCTION

The subject disclosure relates to heating of high voltage batteries such as Lithium chemistry propulsion batteries found in electric vehicles.

Lithium batteries may be preferred in many applications, including propulsion systems, due to their high energy density. Lithium battery discharge performance at cold temperatures is generally much better than lead-acid or Nickel metal hydride batteries, but discharge performance at cold temperatures is still significantly below battery performance capability at higher temperatures. Low temperature charging is limited by anode plating which may cause performance degradation, capacity loss, internal shorts and irreversible damage. Thus, until a Lithium battery reaches a certain temperature, charging a Lithium battery remains extremely limited and discharge performance is reduced. This is especially true at sub-zero temperatures. Various methods of pre-heating a Lithium battery have been proposed including discharge current self-heating using internal resistance, heating/cooling plates, and PTC devices among others incorporated into the battery structure.

SUMMARY

In one exemplary embodiment, a heating apparatus for a battery may include a first solid state switch having respective first and second terminals, and a second solid state switch having respective first and second terminals, with the second terminal of the first solid state switch may be coupled to the first terminal of the second solid state switch at a first node. The apparatus may further include a coupling between a positive terminal of the battery and the first node with an inductance between the first node and the battery, a negative terminal of the battery coupled to the second terminal of the second solid state switch at a second node, a capacitance between the second node and the first terminal of the first solid state switch at a third node, and a controller repeatedly closing the second switch and opening the first switch for a first duration followed by opening the second switch and closing the first switch for a second duration.

In addition to one or more of the features described herein, the inductance may include an intrinsic inductance of the battery.

In addition to one or more of the features described herein, the first solid state switch and the second solid state switch may make one leg of an inverter coupled between a positive DC rail and a negative DC rail.

In addition to one or more of the features described herein, the capacitance may include a capacitor coupled between the positive DC rail and the negative DC rail.

In addition to one or more of the features described herein, the inverter may be a half-bridge inverter.

In addition to one or more of the features described herein, the inverter may be an H-bridge inverter.

In addition to one or more of the features described herein, the inverter may be a polyphase inverter.

In addition to one or more of the features described herein, the controller may be an inverter controller.

In addition to one or more of the features described herein, the closing the switches occurs at zero-voltage conditions.

In another exemplary embodiment, a heating apparatus for a battery may include a battery having a positive terminal and a negative terminal, an electric propulsion system having a polyphase electric machine and a polyphase power inverter, the inverter including a plurality of phase legs coupled between a positive DC rail and a negative DC rail, each phase leg having respective upper and lower switches and a respective phase pole therebetween. Each phase pole may be coupled to a respective phase winding of the polyphase electric machine. The heating apparatus further includes a capacitor coupled between the positive DC rail and the negative DC rail, and a coupling between the positive terminal of the battery and a corresponding phase pole of one of the phase legs with an inductance between the corresponding phase pole and the battery. The negative terminal of the battery may be coupled to the negative DC rail and the positive terminal of the battery may be decoupled from the positive DC rail. The apparatus further includes a controller operating the lower switch of the one of the phase legs complementary to the upper switch of the one of the phase legs, wherein the lower switch is in a closed state while the upper switch is in an open state for a first duration and the lower switch is in an open state while the upper switch is in a closed state for a second duration.

In addition to one or more of the features described herein, the inductance may include an intrinsic inductance of the battery.

In addition to one or more of the features described herein, the heating apparatus may further include a plurality of couplings between the positive terminal of the battery and respective phase poles of a corresponding plurality of phase legs with a respective inductance between the respective phase pole and the battery, and the controller operating the lower switches of the plurality of phase legs complementary to the upper switches of the plurality of phase legs, wherein the lower switches are in a closed state while the upper switches are in an open state for the first duration and the lower switches are in an open state while the upper switches are in a closed state for the second duration.

In addition to one or more of the features described herein, closing the upper switch and the lower switch may occur at zero-voltage conditions.

In addition to one or more of the features described herein, closing the upper switches and the lower switches occurs at zero-voltage conditions.

In addition to one or more of the features described herein, the heating apparatus may include a current sensor for sensing current through the battery, and the controller may be responsive to the current through the battery and a current setpoint to control the first duration.

In addition to one or more of the features described herein, the current sensor may be a phase winding current sensor corresponding to the one of the phase legs.

In addition to one or more of the features described herein, the controller may be an inverter controller.

In yet another exemplary embodiment, a heating apparatus for a battery may include a quasi-resonant circuit having an inductance, a capacitance, and a solid state half-bridge, and a controller alternating the circuit between a first configuration wherein the inductance is coupled directly across the battery and a second configuration wherein the inductance and the capacitance are in series coupled across the battery.

In addition to one or more of the features described herein, the solid state half-bridge may be one leg of an inverter.

In addition to one or more of the features described herein, the inductance may include an intrinsic inductance of the battery.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
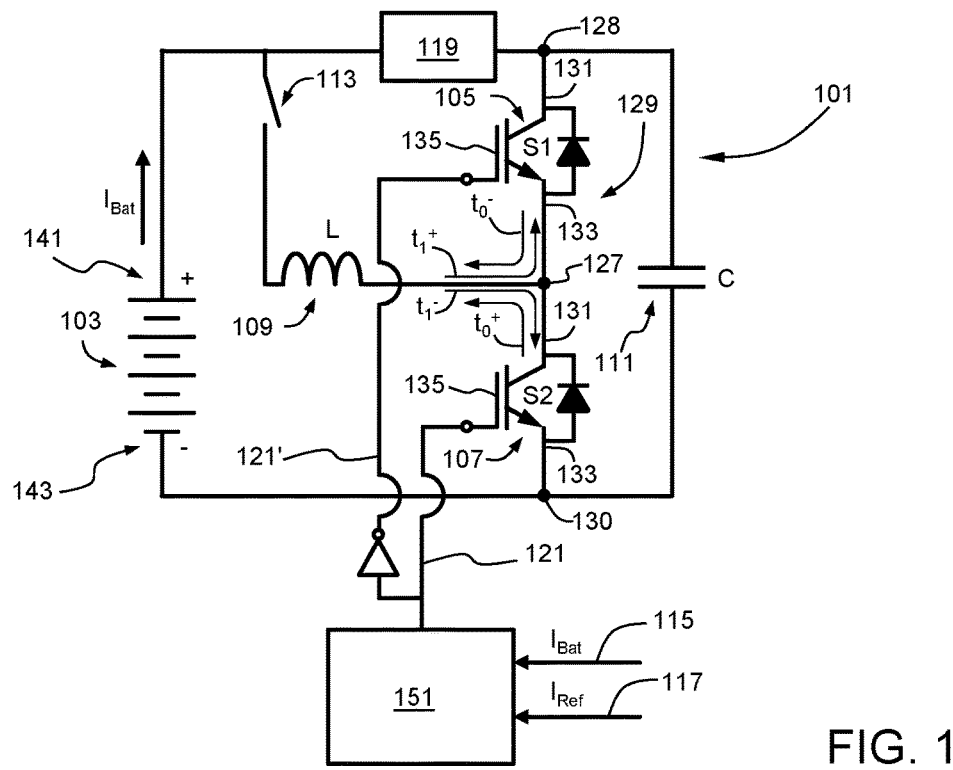
FIG. 1 illustrates a quasi-resonant circuit effecting AC current through a battery, in accordance with one or more embodiments.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/ output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

FIG. 1 illustrates one embodiment of a quasi-resonant circuit 101 effecting AC current through a battery 103 resulting in uniform heating of the battery 103. Battery may refer to a single battery, multiple batteries, a battery module or a battery pack made up of multiple batteries or battery modules. A first solid state switch S1 105 and a second solid state switch S2 107 are coupled to form a half-bridge 129 and defining a first node 127. Each switch S1 and S2 has a respective first terminal 131 and a respective second terminal 133. The half-bridge 129 is formed by coupling the second terminal 133 of the first switch S1 to the first terminal 131 of the second switch S2 at the first node 127. Each switch S1 and S2 includes a control terminal 135 for establishing an open or closed state between the respective first terminal 131 and second terminal 133. Any suitable solid state device may be employed as switches S1 and S2 including, for example, solid state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each switch S1 and S2 may also include a respective anti-parallel diode between the respective first and second terminals 131, 133 either as a discrete component or integrated with each switch S1, S2. A capacitance C 111 is coupled between the first switch S1 first terminal 131 at a second node 128 and the second switch S2 second terminal 133 at a third node 130. The second terminal 133 of the second switch S2 is coupled to a negative terminal 143 of the battery 103. The node 127 is coupled to the positive terminal 141 of the battery 103 through an inductance and a switch. An inductance L 109 is thereby coupled between the node 127 and the positive terminal 141 of the battery 103. The inductance L may include any one or more of a component inductor, intrinsic internal battery inductance, and intrinsic inductance in the coupling (e.g., cable and/or busbar). In one embodiment, a switch 113 may enable selective coupling and decoupling of the node 127 from the battery 103; however, the quasi-resonant circuit 101 is only operational to effect AC current through the battery 103 when node 127 is coupled to the battery. In one embodiment, a capacitor pre-charge circuit 119 may enable selective charging of the capacitance C 111 connected across the node 128 and node 130 of the half-bridge comprised of S1 and S2 by coupling to the battery prior to the quasi-resonant circuit 101 operating to effect AC current through the battery 103; however, the quasi-resonant circuit 101 is only operational to effect AC current through the battery 103 when the capacitance C 111 is decoupled from the battery through the pre-charge circuit 119. The pre-charge circuit in one embodiment may include a current limiting resistor in series with a controllable switch. Thus, it is appreciated that during operation of the quasi-resonant circuit 101 to effect AC current through the battery 103, the node 127 is coupled to the positive terminal 141 of the battery 103 through the inductance L 109 and the second node 128 is not directly coupled to the battery 103.

The quasi-resonant circuit 101 operates by placing the switch S2 into an ON state and the switch S1 into an OFF state for a period of time to allow the battery 103 to source current through the inductance L 109. Thereafter, the switch S2 is placed into an OFF state and the switch S1 is placed into an ON state thereby series coupling the inductance L 109 and capacitance C 111 and placing the series LC combination across the battery 103. The switch S2 is left in the OFF state and the switch S1 is left in the ON state long enough for the circuit to oscillate wherein the current through the series LC combination reverses phase (i.e., direction) at least once.

In one embodiment, a current controller 151 may provide a control signal 121 for switch S2 from which a complementary control signal 121' is derived. A high signal "1", which stands for a voltage that turns the switch fully ON (e.g., 15V at an IGBT or MOSFET gate terminal 135 with respect to the source 133 terminal), at the control terminals 135 puts the switches S1, S2 into an ON state whereas a low signal "0", which stands for a voltage that turns the switch fully OFF (e.g., 0 to −5V for an IGBT or a MOSFET gate terminal 135 with respect to the source 133 terminal), at the control terminals 135 puts the switches S1, S2 into an OFF state. Current controller 151 may be provided a reference current ($I_{Ref}$) 117 and a sensed battery current ($I_{Bat}$) 115 and provide a PWM signal having a preset or adjustable period and a pulse width of the control signal established by a comparison of the battery current ($I_{Bat}$) 115 to the reference current ($I_{Ref}$) 117. When the battery current ($I_{Bat}$) 115 exceeds the reference current ($I_{Ref}$) 117, the current controller 151 establishes the control signal 121 low (0) (switch S2 to the OFF state) and the control signal 121' high (1) (switch S1 to the ON state) for the remainder of the PWM period whereafter the current controller 151 establishes the control signal 121 high (1) (switch S2 to the ON state) and the control signal 121' low (0) (switch S1 to the OFF state). A short delay, known as dead time, may be introduced between the time either of the switches S1, S2 is turned OFF and the other of the switches S1, S2 is turned ON to prevent the capacitance C 111 being short circuited by S1 and S2 being ON simultaneously. During such dead time, both switches S1 and S2 are open. In one embodiment, the dead time may be of the order of 0.5 μs to 2 μs depending on the rated voltage and current of the switches.

Figure 2:
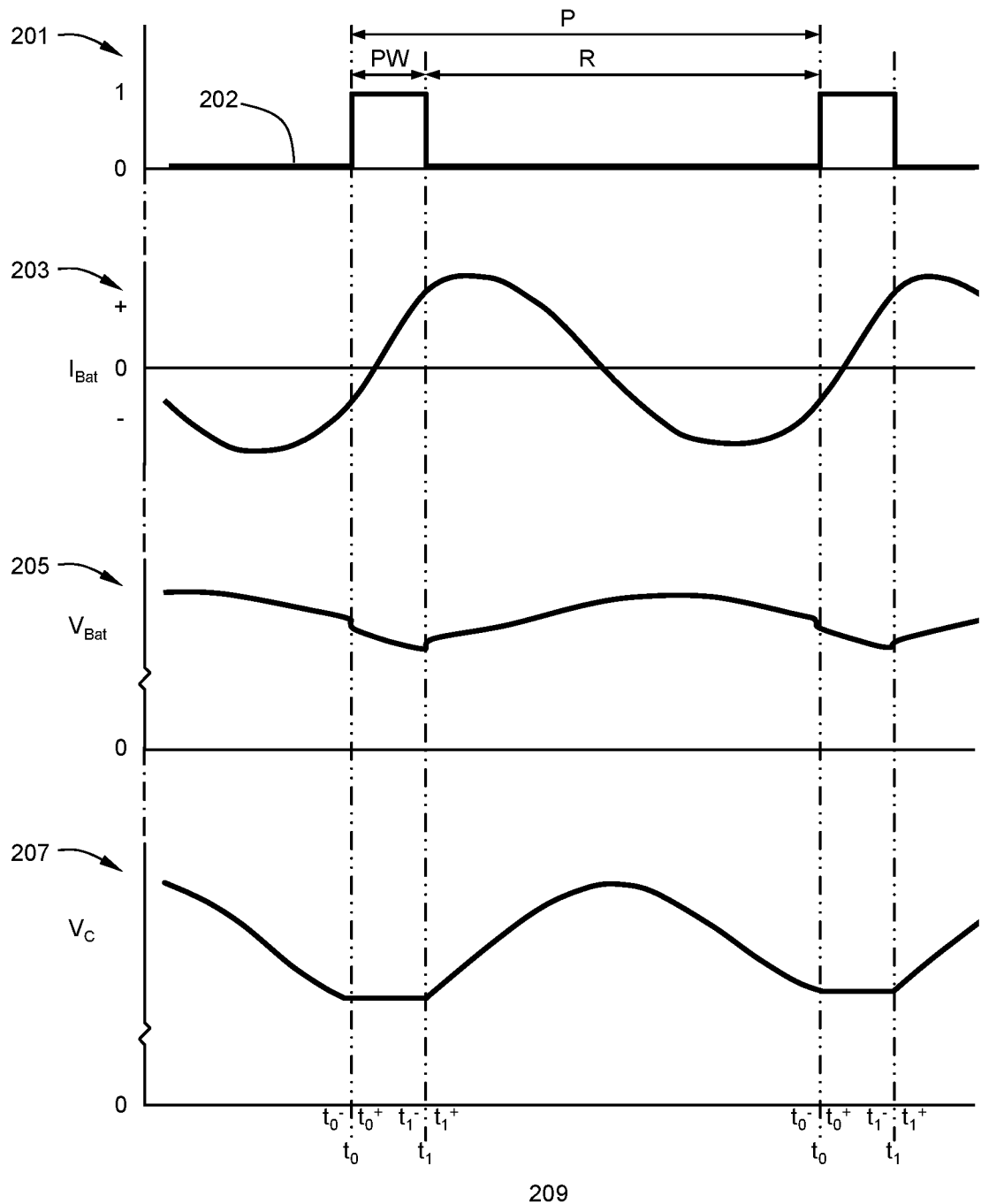
FIG. 2 graphically illustrates the operation of a quasi-resonant circuit in accordance with one or more embodiments.

Additional referenced is made to FIG. 2 which graphically illustrates the operation of one embodiment of a quasi-resonant circuit, for example quasi-resonant circuit 101 as shown in FIG. 1. Four graphs 201-207 are illustrated along a common horizontal timeline 209 and represent control and responses during operation of quasi-resonant circuit 101. Graph 201 represents a PWM control signal 202 corresponding to control signal 121 for switch S2 of FIG. 1. PWM control signal 202 has a period (P) including a first pulse width duration (PW) and a second ringing duration (R). Graph 203 represents the battery current ($I_{Bat}$) 115 which varies in magnitude and phase (+/−). Graph 205 represents battery voltage (\Tsai). Graph 207 represents voltage across the capacitance C 111 ($V_C$). Each pulse width is illustrated relative to a rising edge at time to and a falling edge at time $t_1$. Relative times just prior to $t_0$ are labeled $t_0^-$ and relative times just subsequent to $t_0$ are labeled $t_0^+$. Similarly, relative times just prior to $t_1$ are labeled $t_1^-$ and relative times just subsequent to $t_1$ are labeled $t_1^+$. At time $t_1^-$ switch S2 is in a closed state, switch S1 is in an open state, and battery current ($I_{Bat}$) is positive. Battery current ($I_{Bat}$) direction through switch S2 is labeled $t_1^-$ in FIG. 1. At time $t_1^+$ switch S2 is in an open state, switch S1 is in a closed state, and battery current ($I_{Bat}$) is positive. Battery current ($I_{Bat}$) direction through switch S1 is labeled Win FIG. 1. The battery current ($I_{Bat}$) at the switching instant may flow through the anti-parallel diode of switch S1 and thus the switching may be considered a zero voltage switching event for S1. During the ringing duration, the battery current ($I_{Bat}$) oscillates through the series LC combination thus reversing the phase of the battery current ($I_{Bat}$). At time $t_0^-$ switch S2 is in an open state, switch S1 is in closed state, and battery current ($I_{Bat}$) is negative. Battery current ($I_{Bat}$) direction through switch S1 is labeled $t_0^-$ in FIG. 1. At time $t_0^+$ switch S2 is in a closed state, switch S1 is in an open state, and battery current ($I_{Bat}$) is negative. Battery current ($I_{Bat}$) direction through switch S2 is labeled $t_0^+$ in FIG. 1. The battery current ($I_{Bat}$) at the switching instant may flow through the anti-parallel diode of switch S2 and thus the switching may be considered a zero voltage switching event for S2.

Figure 3:
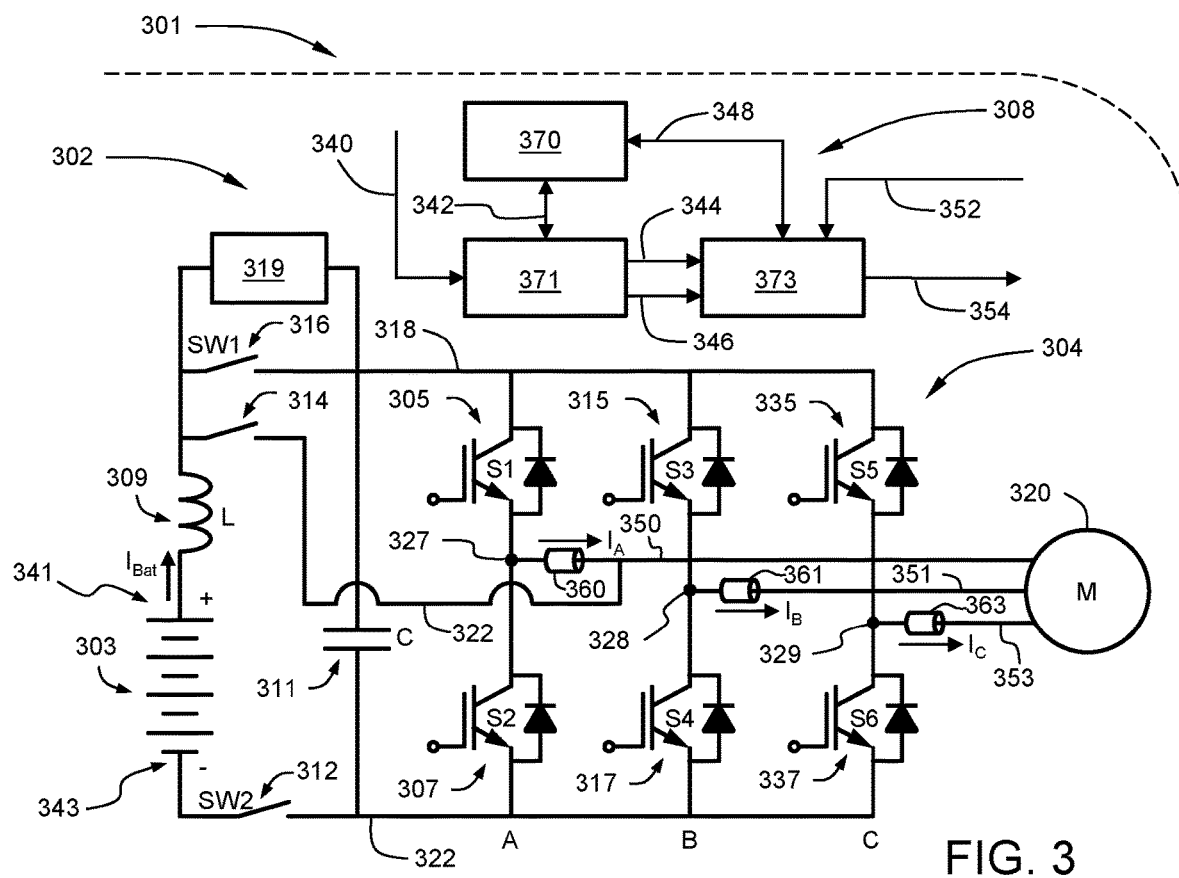
FIG. 3 illustrates an automotive propulsion system including a poly-phase inverter, in accordance with one or more embodiments.

FIG. 3 illustrates another embodiment of a quasi-resonant circuit effecting AC current through a battery resulting in uniform heating thereof in an automotive application. FIG. 3 shows an embodiment of an exemplary vehicle 301. The vehicle 301 may be any automobile, truck, aircraft, construction equipment, farm equipment, factory equipment, etc. whether user or autonomously operated. Vehicle 301 includes an electric propulsion system 302 including a poly-phase AC traction motor 320. Propulsion system 302 may include a control system 308 including one or more electronic control units (ECU), for example a vehicle controller 370, a battery manager 371, and an inverter controller 373. The control system may be responsible for carrying out functions related to propulsion subsystem monitoring, control and diagnostics based upon a plurality of inputs. The vehicle controller 370 may include one or more ECUs and may be responsible as a supervisor for interpreting various user and environmental inputs, information arbitration, and developing and issuing control commands to various other ECUs including the battery manager 371 and the inverter controller 373 as illustrated by communication lines 342 and 348. The battery manager may receive a plurality of inputs 340 related to the battery 303 including, for example, battery voltages, currents and temperatures. The inverter controller 373 may receive various inputs 352 used in the monitoring, control and diagnosis of the AC traction motor 320 and inverter 304, including phase currents $I_A$, $I_B$ and $I_C$ from respective current sensors 360, 361 and 363 and rotor position information from an encoder (not shown). The inverter controller may control the AC traction motor 320 by issuing conduction commands 354 to inverter switches S1 305, S2 307, S3 315, S4 317, S5 335 and S6 337. In accordance with one embodiment, the battery manager 371 may provide a battery heating mode request 344 to the inverter controller 373 and provide battery current targets or setpoints 346.

The inverter 304 includes a positive DC rail 318, a negative DC rail 322 and a plurality of phase legs therebetween. Phase legs in the exemplary 3-phase inverter 304 include switches S1 and S2 coupled at node 327 (phase leg A), Switches S3 and S4 coupled at node 328 (phase leg B), and switches S5 and S6 coupled at node 329 (phase leg C). Phase leg A node 327 couples to phase windings of the AC traction motor 320 via line 350. Phase leg B node 328 couples to phase windings of the AC traction motor 320 via line 351. And phase leg C node 329 couples to phase windings of the AC traction motor 320 via line 353. Each line 350, 351 and 353 may have an associated current sensor 360, 361 and 363, respectively, for sensing phase currents. High current disconnect switch SW1 316 is controllable to couple and decouple the positive DC rail 318 and the positive battery terminal 341. Likewise, high current disconnect switch SW2 312 is controllable to couple and decouple the negative DC rail 322 and the negative battery terminal 343. An inverter input filter capacitor C 311 is coupled between the positive DC rail 318 and the negative DC rail 322. Switch 314 is controllable to couple and decouple the node 327 of phase leg A to the positive battery terminal. Any leg of the inverter may be employed in the present embodiment as an active half-bridge operable in a quasi-resonant circuit as described. A capacitor pre-charge circuit 319 may enable selective charging of the capacitor C 311 by coupling to the battery 303 prior to switch SW1 closures. Similarly, in the present embodiment, the capacitor pre-charge circuit 319 may be employed to pre-charge the capacitor C 311 prior to effecting AC current heating of the battery using one leg of the inverter 304 in a quasi-resonant circuit. As with the embodiment of FIG. 1, the capacitor C 311 is decoupled from the battery 303 during AC current heating with the quasi-resonant circuit. The pre-charge circuit 319 in one embodiment may include a current limiting resistor in series with a controllable switch.

When heating of the battery 303 by AC current is invoked, switches SW1 is kept open and SW2 is closed. Subsequent to any pre-charging of the capacitor C 311, the pre-charge circuit 319 is also opened. Switch 314 is closed to couple the node 327 of phase leg A to the positive battery terminal 341. An inductance L 309 is thereby coupled between the node 327 and the positive terminal 341 of the battery 303. The inductance L 309 may include any one or more of a component inductor, intrinsic internal battery inductance, and intrinsic inductance in the coupling. It is also envisioned to have the inductance placed between the switch 314 and the node 327 as in FIG. 1. The quasi-resonant circuit is only operational to effect AC current through the battery 303 when node 327 is coupled to the battery, switch SW1 and pre-charge circuit 319 are opened, and switch SW2 is closed. In the present embodiment, phase leg A current sensor 360 provides a measure of battery current ($I_{Bat}$) to inverter controller 373. The inverter controller 373 may control the states of switches S1 and S2 in the same manner as described with respect to FIGS. 1 and 2 herein. Thus, it is appreciated that the quasi-resonant operation and AC current heating of the battery 303 may be effected without any added components, relying instead upon intrinsic inductance, existing inverter input filter capacitor C 311, and phase current sensor 360. It is understood, however, that quasi-resonant circuit tuning may be accomplished via additional reactive components and switching networks as understood by one having ordinary skill in the art.

Figure 4:
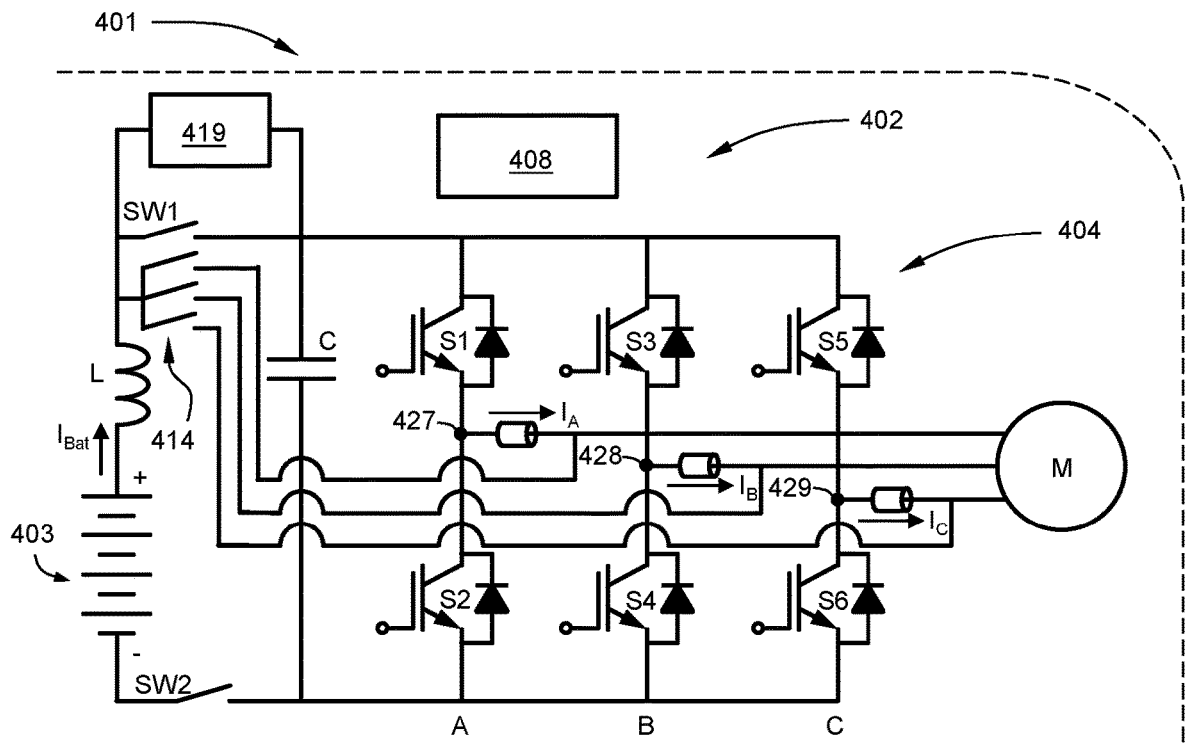
FIG. 4 illustrates an automotive propulsion system including a poly-phase inverter, in accordance with one or more embodiments.

FIG. 4 illustrates another embodiment of a quasi-resonant circuit effecting AC current through a battery resulting in uniform heating thereof in an automotive application. FIG. 4 is not labeled as extensively as FIG. 3; however, it is understood that unless specifically called out, the features of the embodiment of FIG. 3 are shared by the embodiment of FIG. 4. FIG. 4 shows an embodiment of an exemplary vehicle 401. The vehicle 401 may be any automobile, truck, aircraft, construction equipment, farm equipment, factory equipment, etc. whether user or autonomously operated. Vehicle 401 includes an electric propulsion system 402. Thus, the electric propulsion system includes a polyphase AC traction motor, a control system 408 including for example a vehicle controller, a battery manager, and an inverter controller all as described as described herein with reference to the embodiment of FIG. 3. The control system may be responsible for carrying out functions related to propulsion subsystem monitoring, control and diagnostics based upon a plurality of inputs all as described with reference to the embodiment of FIG. 3.

The inverter 404 includes a positive DC rail, a negative DC rail and a plurality of phase legs A, B and C therebetween. Phase legs in the exemplary 3-phase inverter 404 and respective current sensors. The propulsion system may also include a controllable high current disconnect switch SW1 to couple and decouple the positive DC rail and the positive battery terminal. Likewise, a controllable high current disconnect switch SW2 may couple and decouple the negative DC rail and the negative battery terminal. An inverter input filter capacitor C is coupled between the positive DC rail and the negative DC rail. A capacitor pre-charge circuit 419 may enable selective charging of the capacitor C by coupling to the battery prior to switch SW1 closures. Switch 414 is controllable to individually and mutually exclusively couple and decouple the nodes 427, 428 and 429 of phase legs A, B and C to the positive battery terminal. Any leg of the inverter may be employed in the present embodiment as an active half-bridge operable in a quasi-resonant circuit as described. In this embodiment, however, multiple phase legs may be employed simultaneously to effectively increase the current capacity of the AC resonant circuit. In this embodiment, the battery current ($I_{Bat}$) would be the equivalent of the summation of the measured phase current of each active half-bridge.

Figure 5:
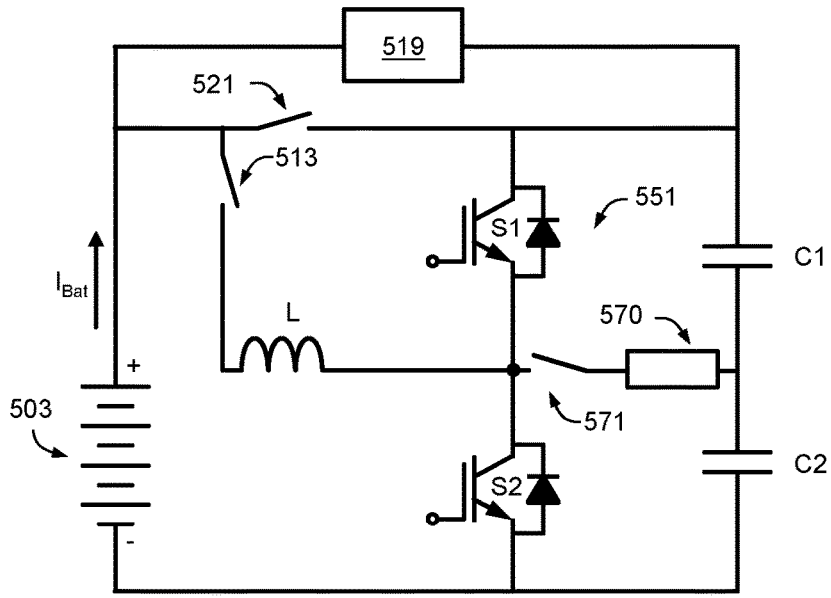
FIG. 5 illustrates a quasi-resonant circuit effecting AC current through a battery, in accordance with one or more embodiments.

FIG. 5 illustrates another embodiment of a quasi-resonant circuit effecting AC current through a battery resulting in uniform heating thereof in an automotive application. FIG. 5 is not labeled as extensively as FIG. 1; however, it is understood that unless specifically called out, the features of the embodiment of FIG. 1 are shared by the embodiment of FIG. 5. FIG. 5 shows an embodiment including a half-bridge 551 formed by coupling the first switch S1 to the second switch S2. The half-bridge in the present embodiment is configured as a half-bridge inverter including a pair of equivalent series coupled capacitors C1 and C2. A load 570 is coupled at one terminal between the capacitors C1 and C2 and at the other end the load 570 is selectively coupled to the half-bridge 551 by a switch 571. A switch 513 selectively couples the positive terminal of the battery 503 to the half-bridge 551. An inductance L is thereby coupled between the half-bridge 551 and the positive terminal of the battery 503. The inductance L may include any one or more of a component inductor, intrinsic internal battery inductance, and intrinsic inductance in the coupling. A switch 521 selectively couples the positive terminal of the battery 503 to the positive DC rail of the half-bridge inverter 551. The switch 513 enables selective coupling and decoupling of the half-bridge inverter 551 from the battery 503; however, the quasi-resonant circuit is only operational to effect AC current through the battery 503 when switch 513 is closed. In one embodiment, a capacitor pre-charge circuit 519 may enable selective charging of the capacitors C1 and C2 by coupling to the battery prior to the quasi-resonant circuit operating to effect AC current through the battery 503; however, the quasi-resonant circuit is only operational to effect AC current through the battery 503 when the pre-charge circuit 519 and switch 521 are open. The switch 521 is closed, the switch 513 is open, and the switch 571 is closed, when the half-bridge is operating in the inverter mode. The switch 521 is open, the switch 513 is closed, and the switch 571 is open, when the half-bridge is operating in the quasi-resonant, AC current heating mode.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A heating apparatus for a battery, comprising:
a first solid state switch having respective first and second terminals and a second solid state switch having respective first and second terminals, wherein the first solid state switch and the second solid state switch comprise one leg of an inverter coupled between a positive DC rail and a negative DC rail;
the second terminal of the first solid state switch coupled to the first terminal of the second solid state switch at a first node;
a coupling between a positive terminal of the battery and the first node with an inductance between the first node and the battery, wherein the inductance is switchably connected to the positive terminal of the battery by a third switch;
a negative terminal of the battery coupled to the second terminal of the second solid state switch at a second node;
a capacitance between the second node and the first terminal of the first solid state switch at a third node; and
a controller repeatedly closing the second switch and opening the first switch for a first duration followed by opening the second switch and closing the first switch for a second duration.

2. A heating apparatus for a battery, comprising:
a quasi-resonant circuit comprising an inductance, a capacitance, and a solid state half-bridge; and
a controller alternating the circuit between a first configuration wherein the inductance is coupled directly across the battery and a second configuration wherein the inductance and the capacitance are in series coupled across the battery.

3. The heating apparatus of claim 2, wherein the solid state half-bridge comprises one leg of an inverter.

4. The heating apparatus of claim 2, wherein the inductance comprises an intrinsic inductance of the battery.

5. The heating apparatus of claim 2, wherein the capacitance comprises a capacitor coupled between a positive DC rail connected to a positive terminal of the battery and a negative DC rail connected to a negative terminal of the battery.

6. The heating apparatus of claim 5, wherein the inductance comprises an intrinsic inductance of the battery.

7. The heating apparatus of claim 1, wherein the capacitance comprises a capacitor coupled between the positive DC rail and the negative DC rail.

8. The heating apparatus of claim 5, wherein the inverter comprises a half-bridge inverter.

9. The heating apparatus of claim 5, wherein the inverter comprises an H-bridge inverter.

10. The heating apparatus of claim 5, wherein the inverter comprises a polyphase inverter.

11. The heating apparatus of claim 5, wherein the controller comprises an inverter controller.

12. The heating apparatus of claim 5, wherein closing the switches occurs at zero-voltage conditions.

13. A heating apparatus for a battery, comprising:
a battery having a positive terminal and a negative terminal;
an electric propulsion system comprising a polyphase electric machine and a polyphase power inverter, the inverter comprising a plurality of phase legs coupled between a positive DC rail and a negative DC rail, each phase leg including respective upper and lower switches and a respective phase pole therebetween, wherein each phase pole is coupled to a respective phase winding of the polyphase electric machine;
a capacitor coupled between the positive DC rail and the negative DC rail;
a coupling between the positive terminal of the battery and a corresponding phase pole of one of the phase legs with an inductance between the corresponding phase pole and the battery;
the negative terminal of the battery coupled to the negative DC rail and the positive terminal of the battery decoupled from the positive DC rail; and
a controller operating the lower switch of the one of the phase legs complementary to the upper switch of the one of the phase legs, wherein the lower switch is in a closed state while the upper switch is in an open state for a first duration and the lower switch is in an open state while the upper switch is in a closed state for a second duration.

14. The heating apparatus of claim 13, wherein the inductance comprises an intrinsic inductance of the battery.

15. The heating apparatus of claim 13, further comprising:
a plurality of couplings between the positive terminal of the battery and respective phase poles of a corresponding plurality of phase legs with a respective inductance between the respective phase pole and the battery; and
the controller operating the lower switches of the plurality of phase legs complementary to the upper switches of the plurality of phase legs, wherein the lower switches are in a closed state while the upper switches are in an open state for the first duration and the lower switches are in an open state while the upper switches are in a closed state for the second duration.

16. The heating apparatus of claim 13, wherein closing the upper switch and the lower switch occurs at zero-voltage conditions.

17. The heating apparatus of claim 15, wherein closing the upper switches and the lower switches occurs at zero-voltage conditions.

18. The heating apparatus of claim 13, further comprising:
a current sensor for sensing current through the battery; and
the controller responsive to the current through the battery and a current setpoint to control the first duration.

19. The heating apparatus of claim 18, wherein the current sensor comprises a phase winding current sensor corresponding to the one of the phase legs.

20. The heating apparatus of claim 13, wherein the controller comprises an inverter controller.

* * * * *